United States Patent
Nakamura

(10) Patent No.: US 8,545,358 B2
(45) Date of Patent: Oct. 1, 2013

(54) GEAR TRANSMISSION

(75) Inventor: Koji Nakamura, Tsu (JP)

(73) Assignee: Nabtesco Corporation, Toyo (JP)

( * ) Notice: Subject to any disclaimer, the term of this patent is extended or adjusted under 35 U.S.C. 154(b) by 0 days.

(21) Appl. No.: 13/520,706

(22) PCT Filed: Nov. 30, 2010

(86) PCT No.: PCT/JP2010/071349
§ 371 (c)(1),
(2), (4) Date: Jul. 5, 2012

(87) PCT Pub. No.: WO2011/083640
PCT Pub. Date: Jul. 14, 2011

(65) Prior Publication Data
US 2012/0283062 A1  Nov. 8, 2012

(30) Foreign Application Priority Data

Jan. 7, 2010  (JP) .................................. 2010-001941

(51) Int. Cl.
*F16H 1/32* (2006.01)
(52) U.S. Cl.
USPC ........................................................ 475/180
(58) Field of Classification Search
None
See application file for complete search history.

(56) References Cited

U.S. PATENT DOCUMENTS

| | | | |
|---|---|---|---|
| 5,322,485 A | 6/1994 | Haga | |
| 5,472,384 A | 12/1995 | Haga | |
| 5,701,671 A | 12/1997 | Haga | |

FOREIGN PATENT DOCUMENTS

| | | |
|---|---|---|
| DE | 10 2009 059 785 A1 | 7/2010 |
| EP | 1 440 254 A1 | 7/2004 |
| EP | 1 440 254 B1 | 7/2005 |
| JP | 01-144550 U | 10/1989 |
| JP | 5-180278 | 7/1993 |
| JP | 11-287301 | 10/1999 |
| JP | 2005-517139 | 6/2005 |
| JP | 2005-201308 | 7/2005 |
| JP | 2009-287634 | 12/2009 |

OTHER PUBLICATIONS

International Preliminary Report on Patentability from parent application No. PCT/JP2010/071349 (English translation thereof), Aug. 16, 2012.
Communication dated May 14, 2013 from European Patent Office in counterpart EP application No. 10842155.3, including Search Opinion, Search Report and examined claims 1-6.
International Search Report from parent application No. PCT/JP2010/071349, Feb. 8, 2011.

*Primary Examiner* — Dirk Wright

(74) *Attorney, Agent, or Firm* — J-Tek Law PLLC; Jeffrey D. Tekanic

(57) ABSTRACT

A gear transmission is provided with an internal gear and an external gear that eccentrically rotates relative to the internal gear while meshing with internal gear. The internal gear includes first recesses formed on an inner circumferential surface of a case so as to be side-by-side in a circumferential direction, and inner pins inserted into the first recesses. A second recess is formed on the inner circumferential surface of the case within a distance from the center of a first recess along the circumferential direction that equals the tooth pitch of the external gear. Lubricant is retained in the second recess.

20 Claims, 1 Drawing Sheet

GEAR TRANSMISSION

CROSS-REFERENCE

This application is the US national stage of International Patent Application No. PCT/JP2010/071349 filed on Nov. 30, 2010, which claims priority to Japanese Patent Application No. 2010-001941, filed on Jan. 7, 2010, the contents of which are hereby incorporated by reference into the present application.

TECHNICAL FIELD

This application generally relates to an eccentric oscillating-type gear transmission. For example, this application relates to the structure of an internal gear of a gear transmission comprising the internal gear and an external gear which eccentrically rotates relative to the internal gear while meshing with the internal gear.

BACKGROUND ART

A gear transmission is known in which, while an external gear is meshing with an internal gear, one of the gears rotates eccentrically relative to the other of the gears. Such a gear transmission may be called an eccentric oscillating-type. In the eccentric oscillating-type gear transmission, the number of teeth of the internal gear and the number of teeth of the external gear differ. In case the external gear is an eccentrically rotating type, the external gear is supported by a carrier. When the external gear rotates eccentrically while meshing with the internal gear, the carrier rotates slower relative to the internal gear in accordance with the difference in the number of teeth of the two gears. An example of this type of gear transmission is disclosed in Japanese Patent Publication No. H5-180278. In the description below, Japanese Patent Publication No. H5-180278 is called Patent Document 1. As illustrated in Patent Document 1, the internal gear often includes a plurality of grooves formed along a circumferential direction on an inner circumferential surface of a case, and cylindrical members inserted into the grooves. Moreover, in the type of gear transmission in which the internal gear rotates eccentrically, the internal gear is supported by a carrier. When the internal gear rotates eccentrically, the carrier rotates slower relative to the internal gear.

SUMMARY OF THE INVENTION

In the gear transmission, lubricant is sealed within the case in order to suppress abrasion of the internal gear and the external gear. There are a type of gear transmission in which the external gear is entirely immersed in the lubricant, and a type of gear transmission in which only a part of the external gear is immersed in the lubricant. In the latter case, the lubricant moves within the case as the external gear and the internal gear rotate relative to one another. Consequently, the lubricant is distributed to all the teeth in the external gear and to all the teeth in the internal gear.

As clearly shown in FIG. 3 of Patent Document 1, the gaps between the tooth tips of the external gear and the inner circumferential surface of the case narrows at the locations where the external gear and the internal gear mesh. Consequently, the lubricant is pushed out from between the internal gear and the external gear. Therefore, the amount of lubricant remaining on the inner circumferential surface of the case (between the teeth of the internal gear) is small. In general, since the gear ratio of eccentric oscillating-type gear transmissions is high, the speed at which the portion immersed in the lubricant (the teeth of the internal gear or the teeth of the external gear) makes a complete revolution is extremely slow. Consequently, the lubricant supplying speed to between the teeth of the internal gear is slow. In eccentric oscillating-type gear transmissions, a structure is desirable in which more lubricant can be retained between the teeth of the internal gear (on the inner circumferential surface of the case).

As described above, eccentric oscillating-type gear transmissions include a type in which the external gear rotates eccentrically and a type in which the internal gear rotates eccentrically. In the description below, the type in which the external gear rotates eccentrically is described. Further, in the case of the type in which the external gear rotates eccentrically, there is a type in which the carrier rotates as the external gear rotates eccentrically, and there is a type in which the internal gear rotates as the external gear rotates eccentrically. In the description below, the type in which the carrier rotates as the external gear rotates eccentrically is described. Moreover, the techniques disclosed in the present invention can be applied to all the aforementioned types of gear transmissions.

In one aspect of the present teachings, a gear transmission is preferably capable of retaining more lubricant between its teeth than the above-described conventional gear transmission. This gear transmission preferably comprises an internal gear and an external gear that eccentrically rotates relative to the internal gear while meshing with internal gear. The internal gear is configured with first recesses formed on an inner circumferential surface of a case so as to be side-by-side in the circumferential direction, and cylindrical members respectively inserted in the first recesses. Further, at least one second recess is formed on the inner circumferential surface of the case within a distance from the center of a first recess in the circumferential direction that equals the tooth pitch of the external gear. In this type of gear transmission, the lubricant can be retained within the (each) second recess even at the location where the internal gear and the external gear mesh.

In one embodiment of the gear transmission disclosed in the present description, the second recess may be formed at a position having a distance from the center of the first recess that equals one-half of the tooth pitch of the external gear. For a device that employs the gear transmission, both forward and reverse rotation may be required as the output rotation. That is, the external gear (carrier) may rotate not only in one direction (forward direction), but also in the reverse direction. If the second recess is formed at the position described above, the relative movement between the tooth tips of the external gear and the second recess will be the same in either forward or reverse rotation. Consequently, a gear transmission can be realized that does not bias the flow of the lubricant in the vicinity of the second recess depending on the rotational direction.

According to the techniques disclosed in the present description, a gear transmission can be provided that is capable of retaining more lubricant between the teeth of the internal gear.

MODES FOR IMPLEMENTING THE INVENTION

Figure 1:
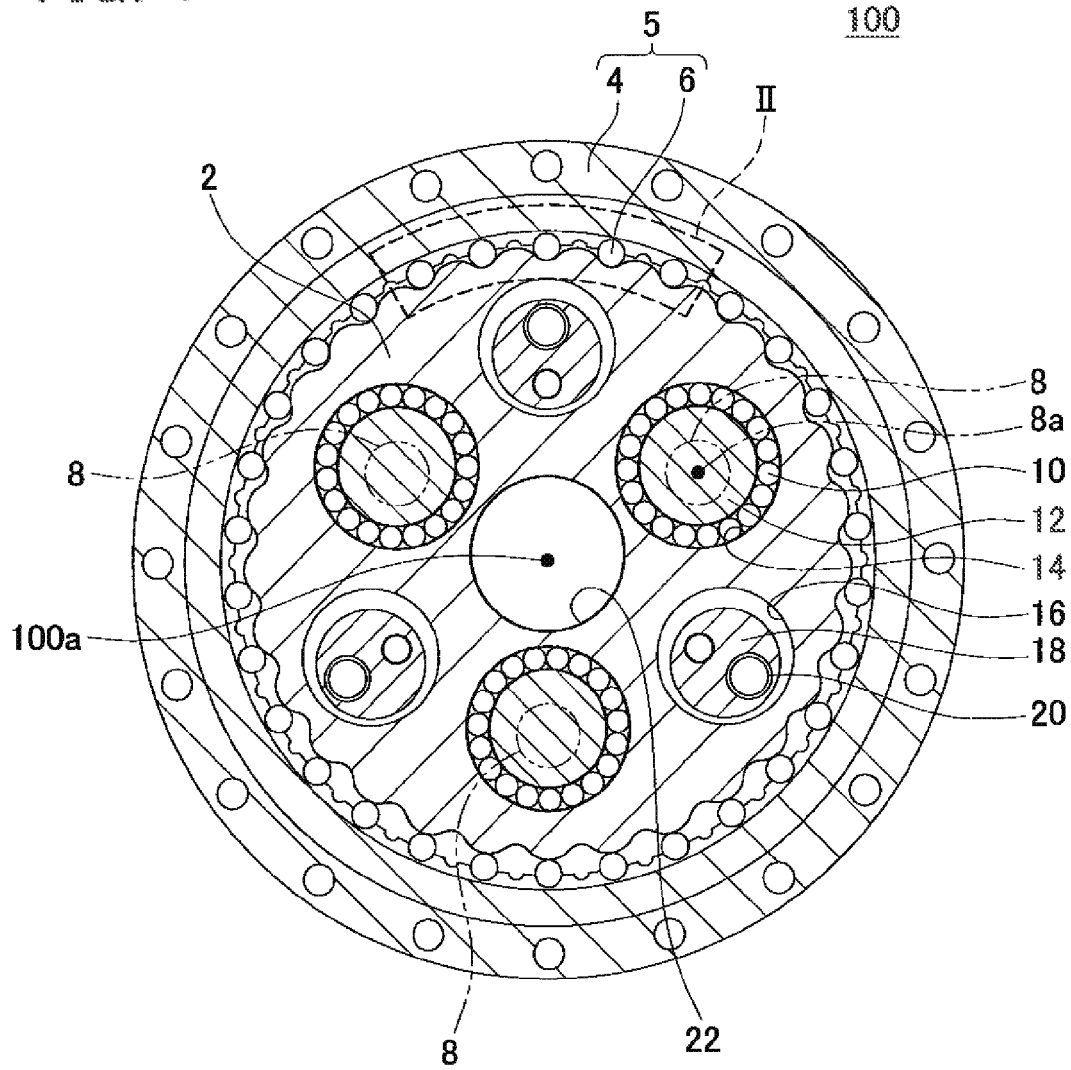
FIG. 1 shows a cross-sectional view of a gear transmission.

FIG. 1 shows a cross-sectional view of a gear transmission 100 along a surface orthogonal to its axial direction (axis 100a). In order to clarify the figure, hatching for representing cross-sections has been omitted for a portion of the components. The gear transmission 100 comprises an external gear 2 and an internal gear 5. The internal gear 5 includes a case 4 of the gear transmission 100 and inner pins 6. Moreover, the inner pins 6 are an example of cylindrical members. The inner circumferential surface of the case 4 is cylindrical, and the inner pins 6 are inserted into grooves formed in the inner circumferential surface of the case 4. The details of the internal gear 5 will be described later.

Through-holes 14, 16 and 22 are formed in the external gear 2. Through-hole 22 is formed in the center of the external gear 2. Relative to the through-hole 22, through-holes 14 and 16 are formed outwardly in the radial direction of the external gear 2. The through-holes 14 and the through-holes 16 are formed alternately around the circumferential direction of the external gear 2. Three through-holes 14 are formed, and an eccentric body 12 is engaged in each of the respective through-holes 14 via cylindrical roller bearings 10. Each eccentric body 12 is formed on a crankshaft 8. The crankshafts 8 extend along a direction orthogonal to the figure, i.e., along the direction of the axis 100a of the gear transmission 100. The number 8a indicates the axes of the crankshaft 8. The axis 8a is parallel to the axis 100a. Both ends of the crankshaft 8 are rotatably supported by a carrier. The carrier includes a pair of circular plates (not shown) positioned at both ends of the external gear 2 in the direction of the axis 100a, and shafts 18 linking the pair of circular plates. Each end of the crankshafts 8 is respectively supported by one of the pair of circular plates.

Three through-holes 16 are formed, and one shaft 18 respectively passes through each of the through-holes 16. Since the shafts 18 are a part of the carrier, the shafts 18 may be called the carrier(s) 18 in the description below. A bolt hole 20 is formed in each shaft 18. The shafts 18 are bolted to the circular plate using the bolt holes 20. The through-hole 22 passes through the gear transmission 100 in the direction of the axis 100a. Wiring, piping, etc. can be passed through the through-hole 22.

When the crankshafts 8 rotate, the eccentric bodies 12 rotate eccentrically around the corresponding axes 8a. The external gear 2 engaged with the eccentric bodies 12 rotates eccentrically while meshing with the internal gear 5. In the gear transmission 100, all the teeth (the inner pins 6) of the internal gear 5 constantly make contact with the external gear 2. That is, the external gear 2 rotates eccentrically relative to the internal gear 5 while changing the degree of meshing with the internal gear 5. The number of teeth of the external gear 2 and the number of teeth of the internal gear 5 (the number of inner pins 6) differ. Consequently, when the external gear 2 rotates eccentrically, the carrier 18 supporting the external gear 2 rotates in accordance with the difference in the number of teeth of the external gear 2 and the internal gear 5. That is, when the crankshafts 8 rotate, the carrier 18 rotates relative to the case 4. The axis of the carrier 18 is equal to the axis 100a of the gear transmission 100. The carrier 18 corresponds to an output shaft of the gear transmission 100.

As described above, the shafts 18 rotate inside the case 4 as the crankshafts 8 rotate. For example, in case the gear transmission is positioned such that the axis of the output shaft (i.e., axis 100a) is horizontal, the lubricant will be transported by the rotation of the external gear 2. Consequently, even if the lubricant is filled within the case 4 to an amount that immerses only a portion of the external gear 2, the lubricant will transported to between all the teeth of the internal gear 5 (the inner circumferential surface of the case 4) as the external gear 2 rotates.

Figure 2:
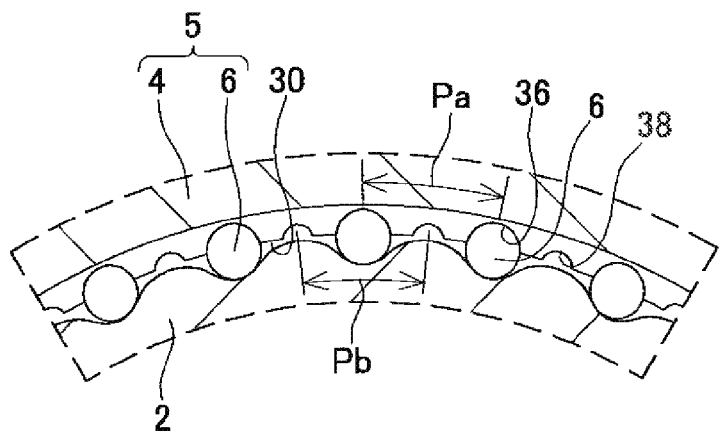
FIG. 2 shows an enlarged cross-sectional view of the area surrounded by dotted line II of FIG. 1.

The internal gear 5 will be described with reference to FIG. 2. FIG. 2 is an enlarged cross-sectional view of the area surrounded by dotted line II of FIG. 1, and shows a location where the external gear 2 and the internal gear 5 are tightly meshed. As described above, the internal gear 5 includes the case 4 and the inner pins 6. A plurality of pin grooves 36, which are side-by-side in the circumferential direction, is formed on an inner circumferential surface 30 of the case 4. The plurality of pin grooves 36 is formed on the inner circumferential surface 30 at equal intervals in the circumferential direction. Each of the pin grooves 36 extends parallel to the axis 100a (see FIG. 1). The inner pins 6 are inserted into the pin grooves 36. The pitch Pa of the pin grooves 36 (the tooth pitch of the internal gear 5) is equal to the tooth pitch Pb of the external gear 2. Consequently, in the location where the external gear 2 and the internal gear 5 are tightly meshed, the tooth tips of the external gear 2 are located between neighboring inner pins 6. In other words, the tooth tips of the external gear 2 are located between neighboring pin grooves 36.

Oil grooves 38 are formed on the inner circumferential surface 30 of the case 4 between neighboring pin grooves 36. The oil grooves 38 are formed between all the neighboring pin grooves 36 (see also FIG. 1). In other words, the oil grooves 38 are formed in each of the spaces between each pair of neighboring pin grooves 36. The pin grooves 36 are an example of the "first recesses", and the oil grooves 38 are an example of the "second recess". The oil grooves 38 are provided for accumulating the lubricant. The oil grooves 38 may be circular recesses, or may be recesses extending in the direction of the axis 100a. Further, the pin grooves 36 and the oil grooves 38 may extend along the direction of the axis 100a up to both ends of the inner circumferential surface of the case 4. The oil grooves 38 may be in any shape, as long as they are recesses formed on the inner circumferential surface 30 of the case 4.

The oil grooves 38 of the present embodiment are formed along the circumferential direction of the case 4 at positions having a distance from the centers of the pin grooves 36 equal to one-half the pitch Pb of the external gear 2. That is, the oil grooves 38 are formed at the midpoint between two neighboring pin grooves 36. As shown in FIG. 2, in the location where the external gear 2 and the internal gear 5 are tightly meshed, tooth bases of the external gear 2 oppose the centers of the inner pins 6 (i.e., the centers of the pin grooves 36). The tooth tips of the external gear 2 oppose the oil grooves 38. Even if the tooth tips of the external gear 2 become close to the inner circumferential surface 30 of the case 4, the lubricant can be retained within the oil grooves 38. If the oil grooves 38 were not formed, when the tooth tips of the external gear 2 become close to the inner circumferential surface 30 of the case 4, the lubricant would be pushed out from the space defined by the two neighboring inner pins 6 and the inner circumferential surface of the case 30 between the two neighboring inner pins 6. In the gear transmission 100 of the present embodiment, the oil grooves 38 for retaining the lubricant are formed on the inner circumferential surface of the internal gear 5, and consequently a large amount of the lubricant can be retained between the teeth of the internal gear 5. Consequently, abrasion of the internal gear 5 and the external gear 2 can be better suppressed than in the conventional gear transmission.

Moreover, the position where the oil groove 38 is formed may be any position, as long as it is within a distance from the center of the pin groove 36 that equals the pitch Pb of the external gear 2. That is, the oil groove 38 may be formed at any position, as long as it is between neighboring pin grooves 36. The lubricant can be retained on the inner circumferential surface 30 of the case 4 regardless of the position of the oil groove 38. However, the position where the oil groove 38 is formed is preferably the midpoint between two neighboring pin grooves 36, as described above. In the gear transmission 100, the tooth tips of the external gear 2 oppose the midpoint of two neighboring pin grooves 36. That is, the tooth tips of the external gear 2 are closest to the inner circumferential surface 30 of the case 4 at the midpoint between two neighboring pin grooves 36. By forming the oil grooves 38 at such a position, the lubricant within the oil grooves 38 is more easily supplied to the external gear 2. As a result, oil film breakdown between the internal gear 5 and the external gear 2 is less likely to occur.

Further, in a device that employs the gear transmission, the external gear 2 (the carrier 18) of the gear transmission 100 can carry out forward and reverse rotations relative to the case 4. For example, in case the gear transmission is being used in a robot joint, both forward and reverse rotations are required by the gear transmission. Consequently, the tooth tips of the external gear 2 may approach the inner circumferential surface 30 of the case 4 from the right side of the paper of FIG. 2, or from the left side. If the oil grooves 38 are formed at the midpoint of two neighboring pin grooves 36, even if the external gear 2 rotates in either the forward or the reverse direction, the relative movement of the tooth tips of the external gear 2 and the oil grooves 38 will be the same, although there is a difference of left/right directions. That is, even if the external gear 2 rotates in either the forward or the reverse direction, the manner that the lubricant flows in the vicinity of the oil grooves 38 will be the same, although there is a difference in the flow direction. By forming the oil grooves 38 at the midpoint of each two neighboring pin grooves 36, there is no bias in the amount of lubricant retained within the oil grooves 38 that depends on the rotational direction of the external gear 2.

As shown in FIG. 1, in the gear transmission 100, inner pins 6 are fitted into all the pin grooves 36. Consequently, a large torque can be transmitted from the external gear 2 to the internal gear 5. Described in more detail, with the inner pins 6 fitted into all the pin grooves 36, the total area of meshing of the external gear 2 and the internal gear 5 increases. Consequently, a large torque can be transmitted between the external gear 2 and the internal gear 5. This means that, in case the same torque is transmitted, the greater the total area of meshing of the external gear 2 and the inner pins 6, the smaller the load applied to the gears. For example, noise decreases when the load applied to the gears is small.

In the gear transmission 100, there is a case that inner pins 6 are not inserted into some of the pin grooves 36 formed at equal intervals. In such a case, two or more tooth tips of the external gear 2 are positioned between neighboring inner pins 6. In such a case as well, with the oil groove 38 formed within a distance from the center of the pin groove 36 that equals the tooth pitch Pb of the external gear, oil film breakdown between the internal gear 5 and the external gear 2 is less likely to occur.

Moreover, in case some of the inner pins 6 have been removed, the lubricant can also be retained within the pin grooves 36. However, as described above, at the location where the internal gear 5 and the external gear 2 become close, the tooth bases of the external gear 2 oppose the pin grooves 36, and the tooth tips of the external gear 2 oppose the oil grooves 38. The space between the external gear 2 and the inner circumferential surface 30 of the case 4 is the smallest at the positions that oppose the tooth tips of the external gear 2. Providing the oil grooves 38 at positions that oppose the tooth tips of the external gear 2 makes it possible to effectively prevent oil film breakdown between the internal gear 5 and the external gear 2.

Moreover, the oil grooves are preferably formed between all the adjacent pin grooves. However, the oil grooves may be formed between only some of the adjacent pin grooves. Alternatively, in case the direction of the internal gear (case) relative to the vertical direction has been determined in advance, the oil grooves may be formed only in the portion where the internal gear is not immersed in the lubricant. As described above, the external gear and the internal gear rotate relative to one another. Even if the oil grooves are not formed between all the adjacent pin grooves, the lubricant is transported from the oil grooves or from the portion immersed in the lubricant to the other portions as the external gear (the carrier) rotates. Further, in the above embodiment, one oil groove is formed between adjacent pin grooves. However, a plurality of oil grooves may be formed between adjacent pin grooves.

Considerations concerning the eccentric oscillating-type gear transmission will be described. As described above, in the gear transmission 100, the internal gear 5 includes the inner pins 6 and the pin grooves 36 formed in the inner circumferential surface 30 of the case 4. Below, this type of internal gear will be called an inner pin-type gear. The inner pins can rotate within the pin grooves. Consequently, even if the tooth surface is curved in an arc shape, slipping between the internal gear and the external gear does not occur, and consequently the inner pin-type gear has excellent torque transmission and quietness properties. Therefore, the inner pin-type gear is suitable for an eccentric oscillating-type gear transmission, and can be widely used. It should be noted that, with the exception of the pin grooves, attention has not been paid in the past to the shape of the inner circumferential surface of the case.

While specific examples of the present invention have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

The invention claimed is:

1. A gear transmission comprising:
    an internal gear including a case having an inner circumferential surface; and
    an external gear configured to eccentrically rotate relative to the internal gear while meshing with the internal gear and having a tooth pitch;
    wherein a plurality of first recesses is formed on the inner circumferential surface of the case so as to be side-by-side in a circumferential direction of the case, each first recess having a center,
    a plurality of cylindrical members is respectively disposed in the first recesses, and
    at least one second recess is formed on the inner circumferential surface of the case at a distance from the center of one of said first recesses in the circumferential direction that is less than the tooth pitch of the external gear.

2. The gear transmission according to claim 1, wherein the at least one second recess is formed at a position disposed at a distance equal to one-half of the tooth pitch of the external gear from the center of said one first recess.

3. The gear transmission according to claim 2, wherein at least one second recess is formed between each pair of neighboring first recesses.

4. The gear transmission according to claim 3, wherein the cylindrical members are pins and the first recesses are axially-extending grooves.

5. The gear transmission according to claim 4, wherein a first through-hole is defined centrally within the external gear, the external gear having a rotational axis that extend through the first through-hole.

6. The gear transmission according to claim 5, wherein the external gear comprises a plurality of second through-holes disposed radially outwardly of the first through-hole and wherein a plurality of crankshafts, each having an eccentric body, is respectively disposed in the second through-holes.

7. The gear transmission according to claim 6, wherein the external gear further comprises a plurality of third through-holes disposed radially outwardly of the first through-hole and wherein a plurality of shafts is respectively disposed in the third through-holes, the shafts being configured to form a part of a carrier.

8. The gear transmission according to claim 7, wherein the external gear has a number of teeth that is less than the number of pins.

9. The gear transmission according to claim 8, wherein the first recesses are formed at equal intervals in the circumferential direction at a distance equal to the tooth pitch of the external gear.

10. The gear transmission according to claim 9, wherein the second recesses are axially-extending grooves configured to retain lubricant.

11. The gear transmission according to claim 9, wherein the second recesses are circular and are configured to retain lubricant.

12. The gear transmission according to claim 9, wherein the second recesses are respectively disposed between adjacent first recesses so that a tip of a tooth of the external gear directly opposes the second recess when adjacent pins are disposed opposite of adjacent tooth bases of the tooth.

13. The gear transmission according to claim 12, further comprising lubricant disposed within the case so as to immerse only a portion of the external gear.

14. The gear transmission according to claim 1, wherein at least one second recess is formed between each pair of neighboring first recesses.

15. The gear transmission according to claim 1, wherein the cylindrical members are pins and the first recesses are axially-extending grooves.

16. The gear transmission according to claim 1, wherein the first recesses are formed at equal intervals in the circumferential direction at a distance equal to the tooth pitch of the external gear.

17. The gear transmission according to claim 1, wherein the second recesses are axially-extending grooves configured to retain lubricant.

18. The gear transmission according to claim 1, wherein the at least one second recess is disposed between adjacent first recesses so that a tip of a tooth of the external gear directly opposes the second recess when adjacent cylindrical members are disposed opposite of adjacent tooth bases of the tooth.

19. A gear transmission comprising:
    an internal gear including a case having an inner circumferential surface, wherein a plurality of first recesses is formed on the inner circumferential surface of the case so as to be side-by-side in a circumferential direction of the case and at least one lubricant recess is defined on the inner circumferential surface of the case between two adjacent first recesses,
    a plurality of pins respectively disposed in the first recesses, and
    an external gear configured to eccentrically rotate relative to the internal gear while meshing with the internal gear.

20. The gear transmission according to claim 19, wherein the at least one second recess is disposed between the two adjacent first recesses so that a tip of a tooth of the external gear directly opposes the second recess when adjacent pins are disposed opposite of adjacent tooth bases of the tooth.

* * * * *